United States Patent
Hauser

(10) Patent No.: US 7,814,116 B2
(45) Date of Patent: Oct. 12, 2010

(54) METHOD AND SYSTEM FOR CREATING CUSTOMIZED NEWS DIGESTS

(76) Inventor: Eduardo A. Hauser, 962 Sanibel Dr., Hollywood, FL (US) 33019

( * ) Notice: Subject to any disclaimer, the term of this patent is extended or adjusted under 35 U.S.C. 154(b) by 171 days.

(21) Appl. No.: 11/377,761

(22) Filed: Mar. 16, 2006

(65) Prior Publication Data

US 2007/0220411 A1 Sep. 20, 2007

(51) Int. Cl.
*G06F 17/30* (2006.01)
*G06F 7/00* (2006.01)

(52) U.S. Cl. .............. 707/769; 705/14.66; 707/628; 707/732; 707/784; 715/234; 715/789; 715/745

(58) Field of Classification Search .............. None
See application file for complete search history.

(56) References Cited

U.S. PATENT DOCUMENTS

| | | | |
|---|---|---|---|
| 4,740,912 A | 4/1988 | Whitaker | |
| 5,710,884 A | 1/1998 | Dedrick | |
| 5,740,549 A | 4/1998 | Reilly et al. | |
| 5,761,662 A | 6/1998 | Dasan | |
| 5,768,528 A | 6/1998 | Stumm | |
| 5,970,231 A | 10/1999 | Crandall | |
| 6,085,229 A | 7/2000 | Newman et al. | |
| 6,157,924 A | 12/2000 | Austin | |
| 6,279,013 B1 | 8/2001 | LaMarca et al. | |
| 6,324,538 B1 | 11/2001 | Wesinger, Jr. et al. | |
| 6,401,075 B1 | 6/2002 | Mason et al. | |
| 6,460,036 B1 | 10/2002 | Herz | |
| 6,560,578 B2 | 5/2003 | Eldering | |
| 6,691,106 B1 * | 2/2004 | Sathyanarayan | 707/3 |
| 6,718,369 B1 | 4/2004 | Dutta | |
| 6,725,203 B1 | 4/2004 | Seet et al. | |
| 6,766,362 B1 | 7/2004 | Miyasaka et al. | |
| 6,807,558 B1 | 10/2004 | Hassett et al. | |
| 6,825,945 B1 * | 11/2004 | Silverbrook et al. | 358/1.15 |
| 6,826,534 B1 * | 11/2004 | Gupta et al. | 705/1 |

(Continued)

OTHER PUBLICATIONS

Buyens, Jim, "Microsoft Windows SharePoint Services Inside Out, Microsoft Press", Library of Congress Control No. 2004118210, ISBN: 073562172, 710 Pages.*

(Continued)

*Primary Examiner*—Greta L Robinson
*Assistant Examiner*—James J Wilcox
(74) *Attorney, Agent, or Firm*—Michael J. Buchenhorner

(57) ABSTRACT

A system is provided for delivering personalized digest documents to multiple users. The system includes a profile module, a content management module, a document creation module, and an interface. The profile module receives a delivery preference of one of the users, and receives at least one of a user attribute and a content preference of the one user. The content management module searches at least one location for content items that match at least one of the user attribute and the content preference. The document creation module receives at least one of the content items that match, and compiles a personalized digest document for the one user that includes the at least one content item that matches. The personalized digest document is in a print-ready format, and the interface delivers the personalized digest document to the one user in accordance with the delivery preference of the one user. Also provided is a method for delivering personalized digest documents to multiple users.

19 Claims, 7 Drawing Sheets

U.S. PATENT DOCUMENTS

| | | |
|---|---|---|
| 6,845,273 B1 | 1/2005 | Taylor |
| 6,892,226 B1 * | 5/2005 | Tso et al. .................... 709/218 |
| 6,920,617 B2 | 7/2005 | Nitta |
| 6,972,875 B2 | 12/2005 | Brewster |
| 2002/0038246 A1 | 3/2002 | Nagaishi |
| 2002/0040374 A1 | 4/2002 | Kent |
| 2002/0161770 A1 | 10/2002 | Shapiro et al. |
| 2002/0169782 A1 | 11/2002 | Lehmann et al. |
| 2002/0184092 A1 | 12/2002 | Cherry et al. |
| 2003/0029911 A1 | 2/2003 | Kitayama |
| 2004/0001087 A1 | 1/2004 | Warmus et al. |
| 2004/0145770 A1 | 7/2004 | Nakano et al. |
| 2005/0033657 A1 | 2/2005 | Herrington et al. |
| 2005/0105134 A1 | 5/2005 | Moneypenny et al. |
| 2005/0165743 A1 | 7/2005 | Bharat et al. |
| 2005/0216336 A1 | 9/2005 | Roberts et al. |
| 2005/0240580 A1 | 10/2005 | Zamir et al. |
| 2005/0288943 A1 | 12/2005 | Wei et al. |
| 2007/0260671 A1 | 11/2007 | Harinstein et al. |

OTHER PUBLICATIONS

International Search Report dated Mar. 10, 2008 for PCT/US07/64135.

* cited by examiner

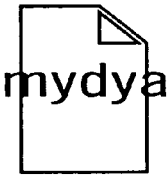

| | January 27, 2006 Update Friday, January 27, 2006 2:12 PM / ET | MARKETS | 1 | National |
|---|---|---|---|---|
| mydya www.mydya.com | | NASDAQ 100 1,704.41 +13.92 | | |
| | | DJTA 4,305.83 -0.70 | Get the world delivered The New York Times | |
| | Miami 70 F   Miami 70 F Mostly Cloudy (21c) Mostly Cloudy (21c) | DJUA 416.68 +1.91 | | |
| | | NYSE 8,081.7 +37.97 | | |

Summary

Bush's Bold Visions Have Given Way to New Reality
By DAVID E. SANGER
Instead of evoking the grand ambitions that have suffused his presidency, the president emphasized the familiar and modest.
N - 1

$39 Billion in Budget Cuts Face Close Vote in House
By DAVID E. SANGER
Instead of evoking the grand ambitions that have suffused his presidency, the president emphasized the familiar and modest.
N - 2

Former U.S. Official in Iraq to Plead Guilty to Corruption
By DAVID E. SANGER
Instead of evoking the grand ambitions that have suffused his presidency, the president emphasized the familiar and modest.
N - 3

Israeli Police Clash With Jewish Settlers in West Bank
By DAVID E. SANGER
Instead of evoking the grand ambitions that have suffused his presidency, the president emphasized the familiar and modest.
N - 4

Bush's Bold Visions Have Given Way to New Reality
By DAVID E. SANGER
Instead of evoking the grand ambitions that have suffused his presidency, the president emphasized the familiar and modest.
N - 5

$39 Billion in Budget Cuts Face Close Vote in House
By DAVID E. SANGER
Instead of evoking the grand ambitions that have suffused his presidency, the president emphasized the familiar and modest.
N - 6

Bush's Bold Visions Have Given Way to New Reality
By STEVEN ERLANGER
and GREG MYRE 12:14 PM ET Only a year after Mr. Bush stood in the House, describing in told terms how he planned to spend the political capital he had amassed in the 2004 election, the president who addressed the nation on Tuesday evening was far less ambitious, his tone noticeably different.
The Texan who swept onto the national political scene six years ago talking about drilling for new energy supplies and preserving the American way of life vowed on Tuesday night to wean the nation from its reliance on oil. Instead of urging Congress to drill in the Arctic, the president who had waved off the critics who had portrayed him and Vice President Dick Cheney as captives of the oil industry asked Congress to finance federal research into alternative fuels and lithium batteries.

FIG. 2

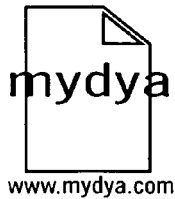
www.mydya.com

| January 27, 2006 Update Friday, January 27, 2006 2:12 PM / ET | MARKETS | 5 Page National |
|---|---|---|
| | NASDAQ 100 1,704.41 +13.92 | |
| | DJTA 4,305.83 -0.70 | Get the world delivered |
| 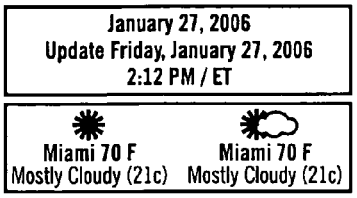 Miami 70 F / Miami 70 F Mostly Cloudy (21c) / Mostly Cloudy (21c) | DJUA 416.68 +1.91 | |
| | NYSE 8,081.7 +37.97 | The New York Times |

| Daniela Roque | xxxxxxxxxxxxxx |
|---|---|

Summary

| | |
|---|---|
| Bush's Bold Visions Have Given Way to New Reality | N-1 |
| $39 Billion in Budget Cuts Face Close Vote in House | N-2 |
| Bush's Bold Visions Have Given Way to New Reality | N-3 |
| Former U.S. Official in Iraq to Plead Guilty to Corruption | N-4 |
| Israeli Police Clash With Jewish Settlers in West Bank | N-5 |
| $39 Billion in Budget Cuts Face Close Vote in House | N-6 |
| Former U.S. Official in Iraq to Plead Guilty to Corruption | N-7 |
| $39 Billion in Budget Cuts Face Close Vote in House | N-8 |
| Former U.S. Official in Iraq to Plead Guilty to Corruption | N-9 |
| Former U.S. Official in Iraq to Plead Guilty to Corruption | N-10 |

Bush's Bold Visions Have Given Way to New Reality
By STEVEN ERLANGER
and GREG MYRE 12:14 PM ET Only a year after Mr. Bush stood in the House, describing in bold terms how he planned to spend the political capital he had amassed in the 2004 election, the president who addressed the nation on Tuesday evening was far less ambitious, his tone noticeably different.
The Texan who swept onto the national political scene six years ago talking about drilling for new energy supplies and preserving.

Bush's Bold Visions Have Given Way to New Reality
By STEVEN ERLANGER
and GREG MYRE 12:14 PM ET Only a year after Mr. Bush stood in the House, describing in bold terms how he planned to spend the political capital he had amassed in the 2004 election, the president who addressed the nation on Tuesday evening was far less ambitious, his tone noticeably different.
The Texan who swept onto the national political scene six years ago talking about drilling for new energy supplies and preserving the American.

Bush's Bold Visions Have Given Way to New Reality
By STEVEN ERLANGER
and GREG MYRE 12:14 PM ET Only a year after Mr. Bush stood in the House, describing in told terms how he planned to spend the political capital he had amassed in the 2004 election, the president who addressed the nation on Tuesday evening was far less ambitious, his tone noticeably different.
The Texan who swept onto the national political scene six years ago talking about drilling for new energy supplies and preserving the American way of life vowed on Tuesday night to wean the nation from its reliance on oil. Instead of urging Congress to drill in the Arctic, the president who had waved off the critics who had portrayed him and Vice President Dick Cheney as captives of the oil industry asked Congress to finance federal research into alternative fuels and lithium batteries.

FIG. 6

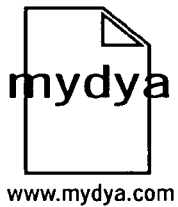

www.mydya.com

January 27, 2006
Update Friday, January 27, 2006
2:12 PM / ET

Miami 70 F Mostly Cloudy (21c)   Miami 70 F Mostly Cloudy (21c)

MARKETS
NASDAQ 100 1,704.41 +13.92
DJTA 4,305.83 -0.70
DJUA 416.68 +1.91
NYSE 8,081.7 +37.97

5 | National

Get the world delivered
The New York Times

Bush's Bold Visions Have Given Way to New Reality
By STEVEN ERLANGER
and GREG MYRE 12:14 PM ET Only a year after Mr. Bush stood in the House, describing in told terms how he planned to spend the political capital he had amassed in the 2004 election, the president who addressed the nation on Tuesday evening was far less ambitious, his tone noticeably different.

The Texan who swept onto the national political scene six years ago talking about drilling for new energy supplies and preserving the American way of life vowed on Tuesday night to wean the nation from its reliance on oil. Instead of urging Congress to drill in the Arctic, the president who had waved off the critics who had portrayed him and Vice President Dick Cheney as captives of the oil industry asked Congress to finance federal research into alternative fuels and lithium batteries. A president who has rarely dwelled on the impact of globalization for American workers was suddenly looking over his shoulder at China and India, and committing the federal government to a quest for 70,000 teachers and 30,000 scientists to prepare American students for a new era of competition.

It was, in short, a speech rooted in some harsh global and political realities, and one unlikely to rank among Mr. Bush's most memorable. Instead of evoking the grand ambitions that have suffused his presidency since the Sept. 11 attacks, Mr. Bush emphasized the familiar and the modest. At a moment of partisan fervor, he offered as olive branch, reviving a pledge to lower the temperature. "Our differences cannot be allowed to harden into anger," he said.

Yet by any measure, Mr. Bush's options are fare more limited than they were a year ago. Much of the momentum he boasted about in the days after his re-election is gone, some of it lost on a bold Social Security initiative that never took off, some washed away by the deeply disorganized federal response to Hurricane Katrina.

The budget deficit, rising again despite Mr. Bush's promise to cut it in half by the time he leaves office in 2009, effectively handcuffs him when it comes to new initiatives. The few new ideas he unveiled were largely thematic, not backed by broad programmatic initiatives.

Mr. Bush's approval ratings, which soared over 90 percent in the days after the terrorist attacks, bounced around in the 30's last fall and now however anemically in the low 40's. His party, beset by a lobbying scandal and a breakdown in discipline on Capitol Hill, is nervous about the coming midterm elections.
With three years left in his presidency, Mr. Bush is certainly farm from that lame-duck moment he used to joke about on his campaign plane — that point in his second term when he said he would "quack like a duck." On Tuesday alone, he won two major victories, the confirmation of Judge Samuel A. Alito Jr. For the Supreme Court and Ben S. Bernanke as chairman of the Federal Reserve.

Both appointments promise to leave Mr. Bush's stamp on Washington long after he has retired to his ranch and began building his presidential library. But in acknowledging on Tuesday that Americans face "a complex and challenging time," Mr. Bush was doing more than issuing a call for global engagement. He was also acknowledging that five years into his presidency, the citizens of the world's most powerful nation do not feel their status has brought them security.
"He needs to reassure us on the economy, and reassure people there is a future they can be positive about, said Michael K. Deaver, the image maker who helped make Ronald Reagan — on whom Mr. Bush has tried to model much of his presidency — a master of optimism. "People have been saying no to that question everyone asks — 'Am I going to be better off a year from now than I am today.'

FIG. 7

METHOD AND SYSTEM FOR CREATING CUSTOMIZED NEWS DIGESTS

FIELD OF THE INVENTION

The present invention relates generally to content delivery, and more particularly relates to methods and systems for creating a customized document from multiple content sources and advertisers.

BACKGROUND OF THE INVENTION

Currently there is a gap in the delivery of information between providers of print content (e.g., newspapers, magazines, and other periodicals) and providers of online content (e.g., MSN, Yahoo!, and AOL). Most providers of print content, in addition to delivering their content in the traditional manner, have begun to also use the Internet to deliver their content. The Internet allows them to utilize electronic delivery methods, primarily websites, newsletters, emails, and electronic alerts. However, such current electronic versions of the printed content are often repurposed versions of the original printed content.

The currently-available electronic versions have not effectively combined the customization power of the Internet, the effectiveness of electronic delivery, and the reading convenience of the print medium into one single media. As a result, most users still use the online medium simply to scan content or read short stories and the print medium to read content.

One example of print content made available online is a website hosted by a newspaper, such as www.sun-sentinel.com, which is an online version of the Fort Lauderdale Sun Sentinel newspaper. Such online versions of newspapers simply present the print media in an electronically friendly and easily accessible medium. However, the content is mostly the same for each user and is simply a reconstituted version of the content of the printed version of the newspaper. The content may be optimized for navigation, but it is not optimized for printing and reading.

Another example of news content available is the New York Times Digest. The New York Times Digest summarizes the main news of the New York Times newspaper and prints it on letter-sized paper generally for fax delivery. However, the New York Times Digest is not customized and the same edition is provided to all of its readers.

Additionally, while there have been significant advances in the delivery of advertising online, little has been done in the area of advertising on printed media. As a result, there remains a significant inefficiency inherent to the media. Readers commonly find that only a small portion of content in a publication is of interest to them. Accordingly, an advertiser suffers dispersion by advertising to a large audience while only a select few are actually of interest to the advertiser.

SUMMARY OF THE INVENTION

Briefly, in accordance with one embodiment of the present invention, disclosed is a system for delivering personalized digest documents to a plurality of users. The system includes a profile module, a content management module, a document creation module, and an interface. The profile module receives a delivery preference of one of the users, and receives at least one of a user attribute and a content preference of the one user. The content management module searches at least one location for content items that match at least one of the user attribute and the content preference. The document creation module receives at least one of the content items that match, and compiles a personalized digest document for the one user that includes the at least one content item that matches. The personalized digest document is in a print-ready format, and the interface delivers the personalized digest document to the one user in accordance with the delivery preference of the one user.

Another embodiment of the present invention provides a method for delivering personalized digest documents to a plurality of users. According to the method, there is received a delivery preference of one of the users and at least one of a user attribute and a content preference of the one user. At least one location is searched for content items that match at least one of the user attribute and the content preference. At least one of the content items that match is received, and a personalized digest document for the one user is compiled. The personalized digest document includes the at least one content item that matches and is in a print-ready format. The personalized digest document is delivered to the one user in accordance with the delivery preference of the one user.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIG. 2 illustrates one document template in accordance with a preferred embodiment of the present invention.

FIGS. 6 and 7 illustrate other document templates in accordance with the preferred embodiment of the present invention.

DETAILED DESCRIPTION OF PREFERRED EMBODIMENTS

Preferred embodiments of the present invention will be described in detail hereinbelow with reference to the attached drawings.

The present invention, according to a preferred embodiment, overcomes problems with conventional systems by matching a user's profile against a plurality of sources to create a content digest that is specifically customized to the user's preferences and optimized for reading. In the context of the present invention, "content" includes a report of recent events or previously unknown information, and is generally material reported in a newspaper, in a news periodical, or on a newscast. For the end-user, the preferred embodiment of the present invention delivers only content of interest to the end-user, and thus avoids the waste that is inherent in typical print media (because a reader is only interested in a small portion of what is printed). For an advertiser, the preferred embodiment of the present invention allows the advertiser to reach into a database of user profiles to build and deliver promotions and advertisements in a highly targeted way and placed in a context consistent with the content. The preferred embodiment automatically locates personalizing content, pushes the content directly to a subscriber, and prints the content in an easily readable format.

Figure 1:
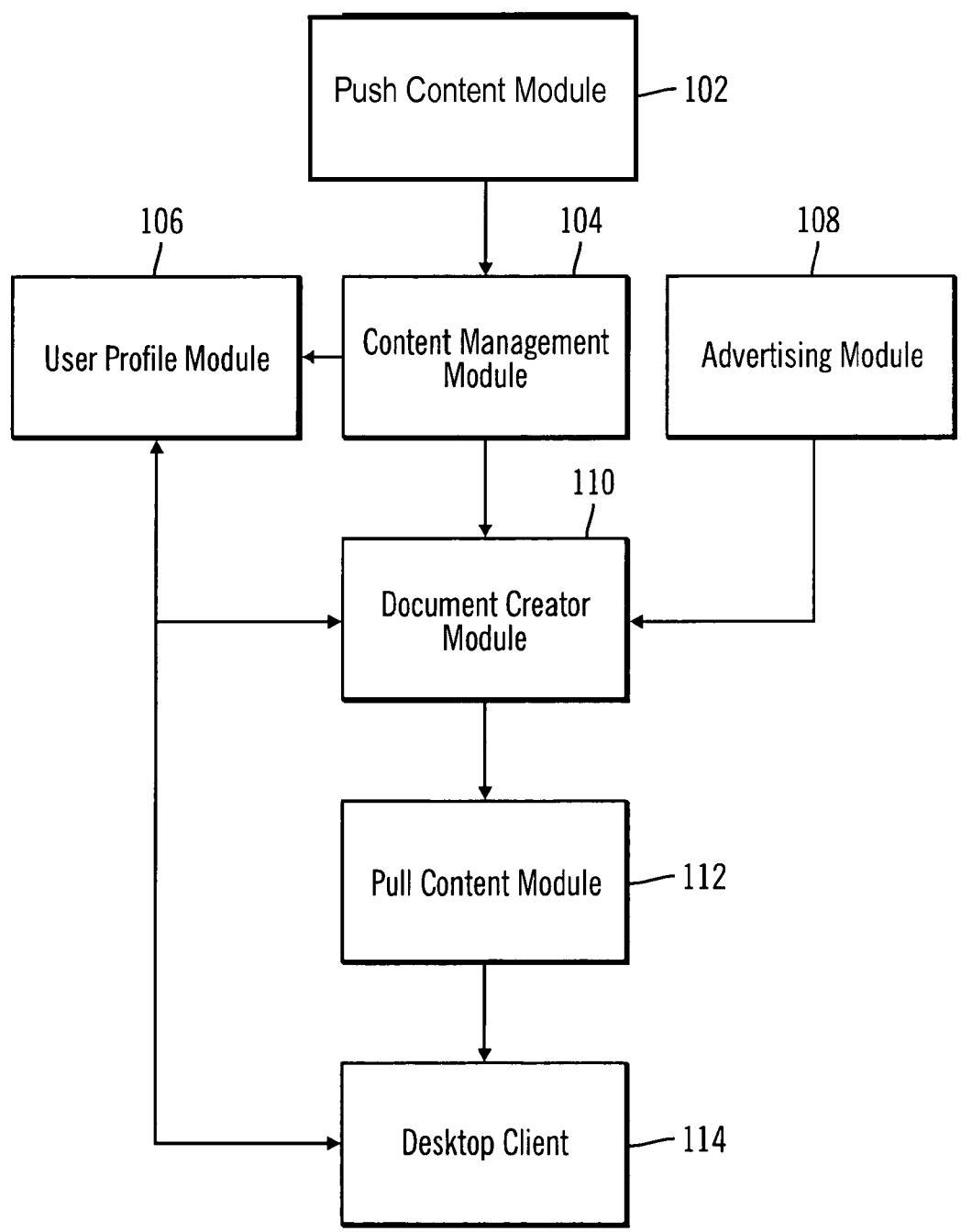
FIG. 1 is a block diagram illustrating the system architecture in accordance with one embodiment of the present invention.

FIG. 1 is a block diagram illustrating the system architecture of one embodiment of the present invention. As shown, the system includes a Push Content Module 102, a Content Management Module 104, a User Profile Module 106, an Advertising Module 108, a Document Creator Module 110, and a Pull Content Module 112, and a Desktop Client 114. Each of these modules can be an independent device, a group of devices, a single device capable of multiple functions (e.g., with each function being a module), a set of computer instructions, or any other hardware and/or software capable of performing the function of the module.

The Push Content Module 102 of this embodiment provides connectivity to the Content Management Module 104 and performs two key functions: (1) mapping fields between the system's database(s) and a content provider's information fields, and (2) running queries against the provider's servers to continuously update the system's content servers with the latest content. The content retrieved by the Push Content Module 102 is added to a database that is administered by the Content Management Module 104.

The Content Management Module 104 performs several actions related to the selection of content for each individual subscriber. In particular, the Content Management Module 104 catalogs, indexes, and maintains the content that is retrieved by the Push Content Module 102. The Content Management Module 104 also serves the content to the Document Creator Module 110 so as to allow the generation of a consumer-ready document. The Content Management Module 104 can reside on any computer, but preferably resides on a network-connected computer system that runs scripts.

The User Profile Module 106 performs the functions of registering, authenticating, and maintaining users in the system's subscriber database. The User Profile Module 106 also creates profiles associated with each individual subscriber. A user creates an account and submits profile properties, such as personal information, content preferences, delivery preferences, format preferences, and so on. These profile properties provide criteria that are used by the system to deliver a news digest that is completely personalized to that single user.

In this embodiment, the personal information in a user's profile includes the user's name, age, sex, zip code, and time zone. This personal information profile is used by the system to procure information that is specifically customized to that user. For instance, if the user profile indicates that the user is over the age of 65, news items aimed at senior citizens (such as news about Medicare reform) will most likely be of greater interest than articles aimed at younger audiences. Similarly, geographically specific news articles are more likely to be of interest to one living in or near the area where the particular news item occurred.

The user's profile also includes content preferences such as local government, sports, real estate, legal, foreign affairs, religion, animals, weather, and so on. These content preferences are used in this embodiment of the present invention to search for articles or other information containing keywords that are indicative of content consistent with the user's profile. For example, if a user's profile indicates an interest in sports content, then articles containing sports terms (e.g., "touchdown") or appearing on sports-related web pages (e.g., www.ESPN.com) are retrieved.

The user's profile can be very broad or very specific, depending on the user's selections during setup or in subsequent profile changes, and on the profile properties offered by a particular embodiment of the present invention. For example, with regard to content preferences related to sports in one embodiment, if a user indicates an interest in only one type of sporting event such as football, then only football related articles are retrieved. If the user further indicates that only a single team or a single player is of interest to the user, this is stored as a content preference so that only articles containing keywords that indicating that team or player are retrieved by the system.

The delivery preferences of the user that are stored in the user profile indicate to the system how a user desires to receive the retrieved information. Exemplary delivery preferences include email, regular mail, web page, electronic file (such as in PDF format), fax, and others. These delivery preference choices provide the user with a variety of ways to receive and print the customized digest at their convenience. For instance, if the system delivers content to a particular user by creating a user-specific web page containing news articles that are specific to the interests of that user, the web page can be accessed and printed by the user from anywhere in the world on any Internet-connected computer. With delivery via a PDF format electronic file, a user can transport the document via a portable storage medium and print from a variety of locations. This also allows the user to recall the news digest for later reading or to transmission it to another person. In one embodiment, the news digest is automatically sent to the user's printer or faxed to the user each day (or other specified period), so that the digest can be easily read each day, without requiring any extra effort on the part of the user.

While in some embodiments, the delivery method dictates the delivery format of the news digest, in this embodiment the delivery format can vary. For this reason, the user profile allows a user to specify format preferences. Such format preferences are particularly useful for electronic delivery methods, such as email. For example, the news digest can be delivered to the user's inbox as a PDF formatted file attachment, a file formatted for a specific word processing program, or an HTML formatted file. The format preferences also specify properties such as color or black-and-white, font size, graphics or no graphics, graphic resolution or quality, number of pages, and the like.

In this embodiment of the present invention, the delivery preferences also indicate a frequency of delivery. Delivery can be virtually any increment of time specified by the user, such as weekly, daily, or even hourly. In addition, the delivery frequency can vary periodically. For instance, a user may specify delivery every hour during the week, but only daily delivery or no delivery at all on weekends.

While this embodiment provides such delivery methods, formats, and frequencies, the present invention is not so limited. Further embodiments use any other delivery method that allows the user to receive the news digest in physical and/or electronic form, along with any other delivery formats and frequencies.

Preferred embodiments of the present invention present multiple templates to the user and allow the user to select one of the templates to indicate the preferred presentation format for the digest. Exemplary document templates for a preferred embodiment of the present invention are shown in FIGS. 2, 6, and 7. With all of these templates, the final document is delivered to the user in a "print-ready" format. That is, the delivered document is able to be printed on standard sized paper by at least a standard printer. As can be seen in FIGS. 2, 6, and 7, each template choice provides the user with a different presentation format. The illustrated format choices share a resemblance to various news papers commonly available to the public. The present invention is not, however, limited to such formats and can be in any format. For example, other formats may contain no graphics at all, only graphics, or graphics with headlines only.

The User Profile Module 106 also manages the synchronization events that activate the creation of a document for each individual subscriber. The User Profile Module 106 applies individual filters, based on each subscriber's content preferences, to the content provided by the Content Management Module 104.

The Document Creator Module 110, which is a server-based application in this embodiment, generates a document for each individual subscriber based on that user's preferences. In this exemplary embodiment, scripts are used to generate this document. If a user has requested that news content be delivered in the form of a web page, the Document Creator Module 110 creates a web page containing the relevant information. Further, if the user has requested both the creation of a web page and email delivery, every time the user is scheduled to receive a news digest the Document Creator Module 110 creates a web page containing the relevant information and then calls the same script generator that generated the web page to generate an email, with the appropriate modifications to convert the document into the email format.

To generate an electronic file in PDF or another requested file format, the system of this embodiment uses an approach similar to the email delivery method. The scripts generate a web page as described above, and then convert the web page on the server side to a PDF, HTML, or other file format document. The result is an electronic file that the Desktop Client is able to download and print.

The Document Creator Module 110 integrates with the User Profile Module 106 to set each individual's profile. The Document Creator Module 110 integrates with the Content Management Module 104 to parse the content that is specific to each individual subscriber as specified by the Content Management Module 104. The Document Creator Module 110 also integrates with the Advertising Module 108 to retrieve and display advertisements that suit individual profiles and/or the content. The documents generated by the Document Creator Module 110 are delivered to the Pull Content Module 112 for individual distribution to subscribers.

The Pull Content Module 112 is responsible for the delivery of documents to each individual client in the format available to the end-user. In addition, the Pull Content Module 112 initiates and manages sessions a user's Desktop Client 114 and the rest of the system.

The Desktop Client 114 is an application or software module that receives documents from the Pull Content Module 112 and manages the automatic printing function. More specifically, the Desktop Client 114 causes the appropriate output device (e.g., a printer) to automatically output (e.g., print) the news digest that is received from the Pull Content Module 112 at the interval specified by the user in the user's preferences. Thus, the Desktop Client 114 automatically presents a printed version of the personalized news digest to the user.

Other delivery preferences that are followed by the Pull Content Module 112 and/or the Desktop Client 114 include time of delivery, color or black-and-white, resolution, and the number of pages to print. For example, in this embodiment the Pull Content Module 112 delivers a news digest that has a total number of printed pages that is less than or equal to the total number of printed pages specified in the user's delivery preferences, and the Desktop Client 114 prints the news digest with such this same number of pages. The Desktop Client 114, in this embodiment of the present invention, is an application that executes on the user's personal computer (PC). However, in further embodiments the Desktop Client can be any other combination of hardware and/or software, such as a server, a PDA or palmtop, or a "smart" printer.

The Desktop Client 114 also accepts a user's preference selections and communicates them to the User Profile Module 106. The Desktop Client 114 includes a graphical user interface that provides communication between the user and the system. In addition, the Desktop Client 114 is responsible for authenticating the user and/or user's computer with the User Profile Module 106 to ensure proper document management and delivery.

In this embodiment, the Push Content Module 102, Content Management Module 104, User Profile Module 106, and Advertising Module 108 perform functions for ensuring that the most current or pertinent content is on the first page of, or at least within, the resulting news digest. In one embodiment of the present invention, each time the digest is created according to the user's preferences, the Push Content Module 102 locates news items that have been posted most recently, or news items that are most current, and indicates to the Document Creator Module 110 that these content items are to be in the digest that will be communicated to the user.

Embodiments of the present invention can utilize any known or future developed techniques for analyzing content. Such techniques currently include keyword searching, string searching, file header interpretation, and others. These searching methods allow the system of the present invention to locate news items or other content that are logically consistent with the user's preferences.

As described above, embodiments of the present invention locate, retrieve, and present to a user only items of interest to that user based on the user's preferences. This provides advertisers with an advantage as compared with a conventional newspaper that is likely to contain a large amount of content that is not of interest to the reader, and therefore, never read by the reader. In particular, an advertiser placing advertisements in a conventional newspaper can only hope that their advertisement will be positioned in a place that will be read by a large number of readers or by those readers most of interest to the advertiser. On the other hand, in preferred embodiments of the present invention, an advertiser can take full advantage of the targeted content and place advertisements within the news digest where the advertising is guaranteed to be among content that is of interest to that digest's reader.

In the exemplary embodiment of the present invention shown in FIG. 1, an Advertising Module 108 is coupled to the Document Creator Module 110. The Advertising Module 108 allows advertisers to place ads in news digests that contain content items that indicate that the reader of that digest has an interest in the advertiser's product or service.

The Advertising Module 108 analyzes the user's preferences (such as location, gender, age, profession, education, and interests), and determines advertisements that are likely to be of interest to a person with such demographics. The Advertising Module 108 communicates with the Document Creator Module 110 to determine where in the digest a particular article or content item will appear, and then interjects the appropriate advertisements into the news digest by sending the advertisements and selected locations to the Document Creator Module 110.

By matching a user's profile against multiple sources of content, the system of the present invention generates a news digest that is completely customized to that user's preferences. Such customization has at least two very special and distinct advantages. First, for the end user, only content that matters to the end-user is delivered, so as to avoid the waste that is typical of conventional print media (because a reader is only interested in a small portion of what is printed). Further, an advertiser is given the ability to reach into a base of users and build and deliver promotions and advertisements in a highly targeted manner. Such an approach to advertisement selection and placement in a printed news digest involves a novel combination of the power of the Internet and the convenience of print.

Figure 3:
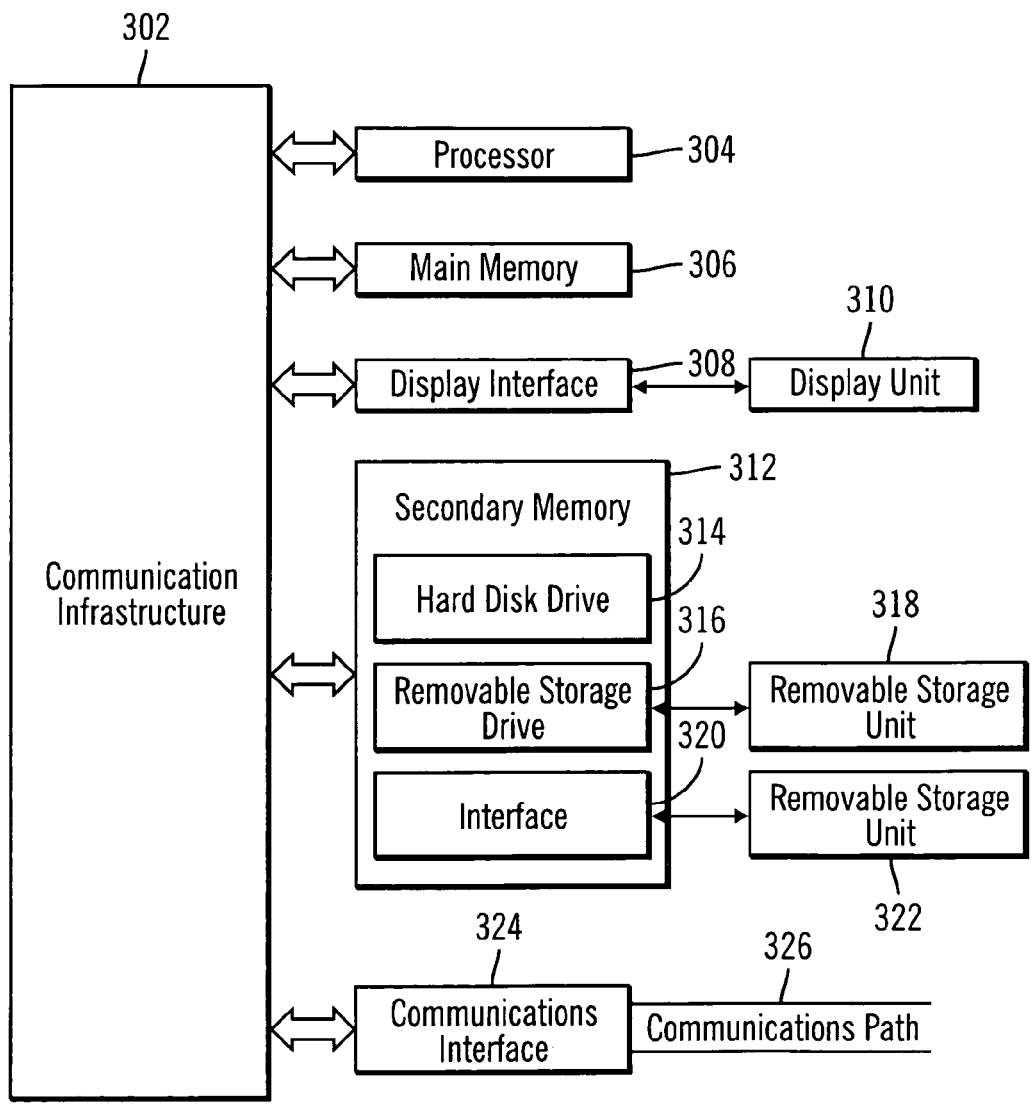
FIG. 3 is a block diagram of a computer system useful for implementing an embodiment of the present invention.

FIG. 3 is a block diagram of an exemplary computer system for implementing the modules described above. The computer system includes one or more processors, such as processor 304. The processor 304 is connected to a communication infrastructure 302 (e.g., a communications bus, crossover bar, or network). The computer system also includes a display interface 308 that forwards graphics, text, and other data from the communication infrastructure 302 (or from a frame buffer not shown) for display on the display unit 310.

The computer system also includes a main memory 306, preferably random access memory (RAM), and also includes a secondary memory 312. The secondary memory 312 includes, in this example, a hard disk drive 314 and/or a removable storage drive 316, representing a floppy disk drive, a magnetic tape drive, an optical disk drive, or the like. The removable storage drive 316 reads from and/or writes to a removable storage unit 318 in a well known manner. The removable storage unit 318 is read by and written to by removable storage drive 316. The removable storage unit 318 includes a computer usable storage medium having stored therein computer software and/or data.

In alternative embodiments, the secondary memory 312 includes other similar means for allowing computer programs or other instructions to be loaded into the computer system, such as a removable storage unit 322 and an interface 320. Examples of such include a program cartridge and cartridge interface (such as that found in video game devices), a removable memory chip (such as an EPROM or PROM) and associated socket, and other removable storage units 322 and interfaces 320 which allow software and data to be transferred from the removable storage unit 322 to the computer system.

The computer system also includes a communications interface 324 that allows software and data to be transferred between the computer system and external devices. Examples of communications interface 324 include a modem, a network interface (such as an Ethernet card), a communications port, and a PCMCIA slot and card. Software and data transferred via communications interface 324 are in the form of signals that are electronic, electromagnetic, optical, or in another form capable of being received by communications interface 324. These signals are provided to communications interface 324 via a communications path (i.e., channel) 326. This channel 326 carries signals is implemented using wire or cable, fiber optics, a phone line, a cellular phone link, an RF link, and/or other communications channels.

The terms "computer program medium," "computer usable medium," and "computer readable medium" generally refer to media such as main memory 306 and secondary memory 312, removable storage drive 316, and a hard disk installed in a hard disk drive 314. These computer program products are means for providing software to the computer system. The computer readable medium allows the computer system to read data, instructions, messages or message packets, and other computer readable information from the computer readable medium. The computer readable medium, for example, may include non-volatile memory (such as a floppy disk, ROM, Flash memory, CD-ROM, or other permanent storage). It is useful for transporting information, such as data and computer instructions, between computer systems.

Computer programs (also called computer control logic) are stored in main memory 306 and/or secondary memory 312. Computer programs may also be received via communications interface 324. Such computer programs, when executed, enable the computer system to perform the functions and provide the features of the present invention as discussed herein. Accordingly, such computer programs represent controllers of the computer system.

A script is a specific type of computer program that includes one or more lines of computer instructions residing on a computer readable medium, such as main memory 306, secondary memory 312, removable storage drive 316, and a hard disk installed in hard disk drive 314. Scripts are read by the processor 304 and cause the computer to perform functions. For example, in the embodiment described above, scripts are used to cause the computer to read user-profile information from a database containing the user-profile information. Scripts are also used in that embodiment to instruct the computer system to search, via communication interface 324, multiple locations (e.g., remote locations) for news articles that are logically consistent with the user profile preferences. Possible remote locations for searching include any media storage area that is communicatively coupled to the Content Management Module 104, which includes any content accessible via the Internet or any other network. The scripts then instruct the computer to retrieve the matching content for storage in memory or communication to the user.

Figure 4:
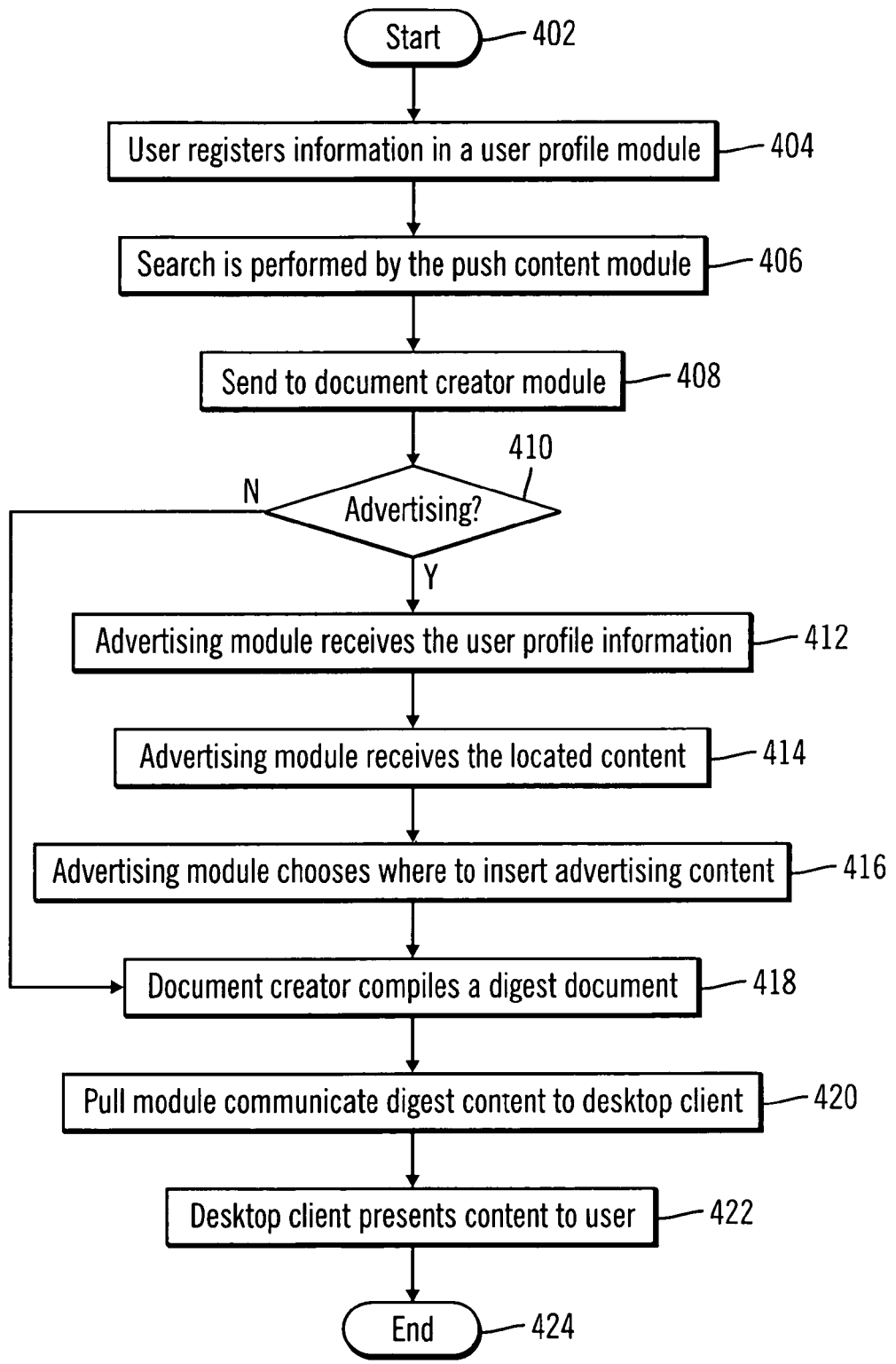
FIG. 4 is a flowchart depicting the operation and control flow of the news digest creation process according to one embodiment of the present invention.

FIG. 4 is a flowchart depicting the operation and control flow of the news digest creation process according to one embodiment of the present invention. The process begins with step 402 and proceeds directly to step 404. In step 404, a user registers information in a user profile module 106. Then, in step 406 a search is performed by the Push Content Module 102, in accordance with the criteria of the user profile. Once content is found by the Push Content Module 102, the Content Management Module 104 receives the located content and sends it to the Document Creator Module 110 in step 408. Next, in decision block 410, a determination is made as to whether or not advertising will be placed in the final document. If the determination is positive, in step 412 the Advertising Module 110 receives the user profile from user profile module 106. In step 414, the Advertising Module 110 receives the content located by the Push Content Module 102 in step 406. Next, in step 416, the Advertising Module analyzes the user profile and the located content and communicates to the document creator 110 where to insert the specific advertising content. Then, in step 418 the document creator receives content from the Advertising Module 108 and compiles a digest document.

If the determination of step 410 is negative, then the next step is step 418 in which the Document Creator Module 110 receives content from the Content Management Module 104 and compiles a digest document.

After step 418, the news digest content is communicated from the Document Creator Module 110 to the Desktop Client 114 in step 420. In step 422, the Desktop Client 114 presents the content to the user in a manner specified by the user during the registration process of step 402. The process then ends at step 424.

Figure 5:
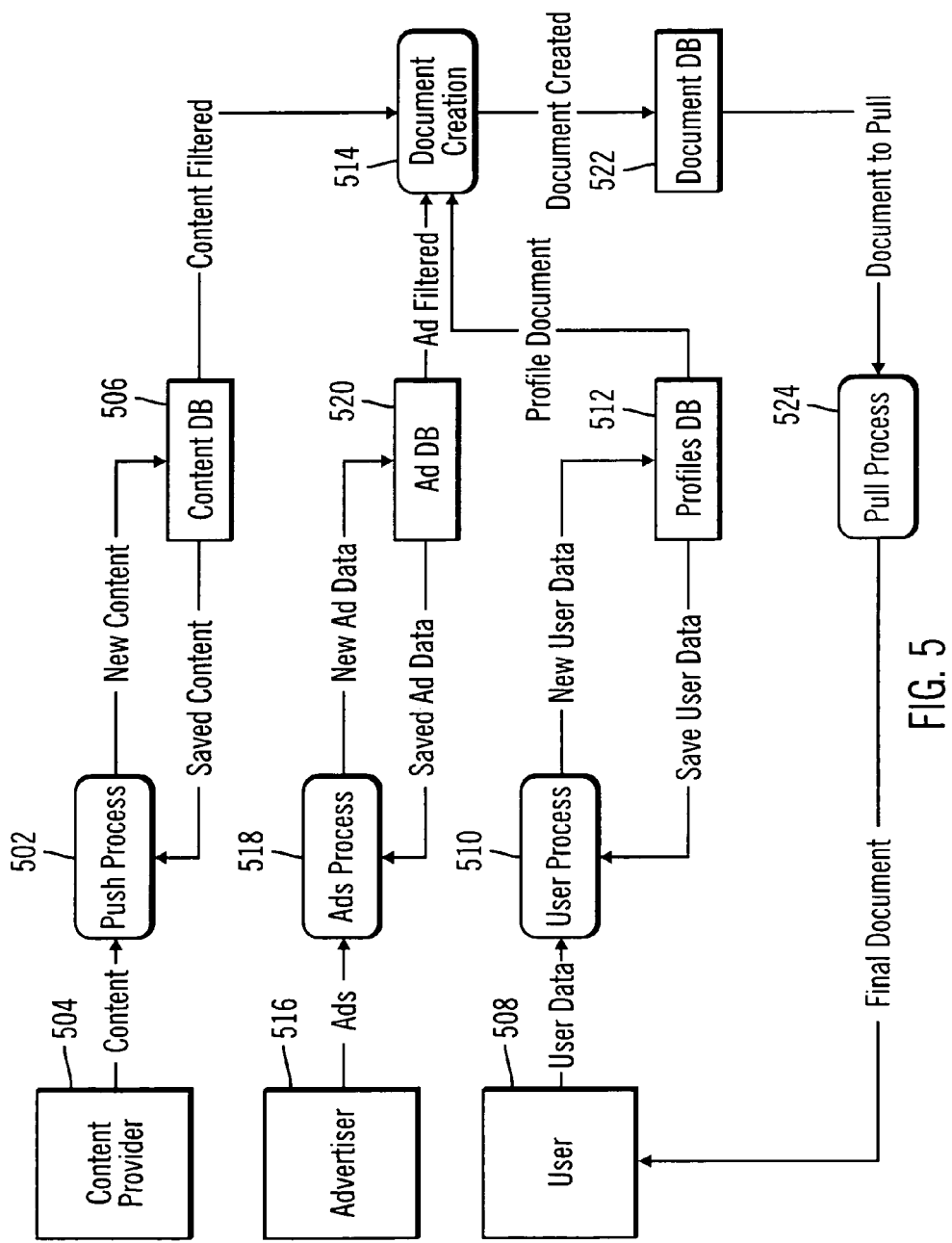
FIG. 5 is a diagram depicting the information flow of the news digest creation process of FIG. 4.

FIG. 5 shows information flow in the process of FIG. 4. As shown, a push process 502 continuously or periodically receives content from a content provider 504. The push process 502 compares the content received from the content provider 504 to saved content stored on a content database 506. If the content is not already in the content database 506, the push process 502 sends the new content to the content database 506 for storage.

A user 508 enters user data into a user process 510. The user data is used to create a user profile in a profile database 512. The profile database 512 stores all user profiles and communications the profiles to the document creation module 514. The document creation module 514 utilizes the user profile to retrieve content from the content database 506 that is specific to the user profile.

In this embodiment of the present invention, an advertiser 516 sends advertising content to an advertisement process 518. The advertisement process 518 sends new advertising content to an advertisement database 520 by comparing advertising content previously stored in the database 520 to the new content received from the advertiser 516.

The content within the content database 506 is filtered and only content that is consistent with a particular user profile is received by the document creation module 514. Similarly, advertising content within the advertisement database 520 is filtered and only advertisements that are consistent with a particular user profile are received by the document creation module 514. The document creation module 514 then creates a document that includes the filtered content and advertisements. This document is sent to a document database 520 for storage.

A pull process 524 pulls the appropriate document from the document database 520 and delivers the document to the user 508. The pull process 524 pulls the document in conformance with the user's preferences, as stated in the user profile. The preferences of this embodiment include method of delivery, time of delivery, and frequency of delivery.

Accordingly, by combining an innovative methodology with novel software tools, embodiments of the present invention allow users to receive a "periodic news digest" (or "electronically delivered newspaper") in their homes or offices. In addition, by leveraging the profiles built by or for each end user, the invention generates a completely customized periodical that is electronically delivered or even physically mailed to its subscribers.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A computer system for electronically delivering personalized periodic news digest documents to a plurality of registered users, the computer system comprising:
at least one processor arranged to:
receive a delivery preference of each of the plurality of the registered users, the delivery preference indicating how each registered user desires to receive the personalized periodic news digest document, wherein a registered user is one who has registered personal information in a user profile, said personal information comprising the registered user's name, age, sex, zip code, time zone, and email;
receive the personal information of each registered user and a news article preference of the registered use, wherein the news article preference comprises sports, local and foreign affairs, and legal;
search at least one location for news items that match the at least one of: the personal information and the news article preference of the registered user;
receive the news items that match;
automatically generate, from the matching news items that are received, a print-ready personalized periodic news digest document that comprises the matching news items, the personalized periodic news digest document being generated as a document selected from a group consisting of: an email, a web page, an electronic file, and a fax, in accordance with the delivery preference of the registered user; and
electronically push the personalized periodic news digest document directly to the registered user in accordance with the delivery preference of said registered user;
wherein the news article preference indicates at least one type of news article that the registered user desires to receive.

2. The computer system according to claim 1, wherein the delivery preference indicates a document template selected by the registered user, said document template specifying a presentation format for the personalized periodic news digest document, and
wherein the personalized periodic news digest document is formatted in accordance with the document template selected by the registered user.

3. The computer system according to claim 1, wherein the delivery preference also indicates a maximum total number of printed pages for the personalized periodic news digest document.

4. The computer system according to claim 1, wherein the at least one processor is further arranged to supply advertising content based on at least one of: the personal information of the registered user and the news article preference of the registered user.

5. The computer system according to claim 4, wherein the at least one processor is further arranged to indicate a location within the personalized periodic news digest document for the advertising content that is supplied.

6. A method for electronically delivering personalized periodic news digest documents to a plurality of registered users, the method comprising steps of:
using a processor arranged to:
retrieve a delivery preference of one of the registered users, wherein the registered user is one who has registered personal information in a user profile, and said personal information comprising the registered user's name, age, sex, zip code, time zone, and email; and wherein the delivery preference indicates how the registered user desires to receive the personalized periodic news digest document;
retrieve the personal information of the registered user and a news article preference of the registered user, wherein the news article preference comprises sports, local and foreign affairs, and legal;
search at least one location for news articles that match at least one of: the personal information and the news article preference;
receive the news articles that match;
automatically generate, from the matching news articles that are received, a print-ready personalized periodic news digest document that comprises the matching news articles, the personalized periodic news digest document being generated as a document selected from a group consisting of: an email, a web page, an electronic file, and a fax, in accordance with the delivery preference of the registered user;

electronically push the personalized periodic news digest document directly to the registered user in accordance with the delivery preference of said registered user; and initiate a client module of the registered user such that the client module automatically prints the personalized periodic news digest document that was electronically pushed to the registered user;

wherein the news article preference indicates at least one type of news article that the registered user desires to receive.

7. The method according to claim 6, wherein the delivery preference also indicates a document template selected by the registered user, said document template specifying a presentation format for the personalized periodic news digest document, and in the automatically generating step, the personalized periodic news digest document is formatted in accordance with the document template selected by the registered user.

8. The method according to claim 6, wherein the delivery preference also indicates a maximum total number of printed pages for the personalized periodic news digest document.

9. The method according to claim 6, further comprising a step of supplying advertising content based on at least one of: the personal information and the news article preference.

10. The method according to claim 9, wherein the step of supplying advertising content comprises indicating a location within the personalized periodic news digest document for the advertising content that is supplied.

11. A tangible computer-readable storage medium encoded with a computer program for electronically delivering personalized periodic news digest documents to a plurality of registered users, said computer program comprising instructions for performing steps of:

receiving a delivery preference of each registered user, wherein a registered user is one who has registered personal information in a user profile, and said personal information comprises the registered user's name, age, sex, zip code, time zone, and email; wherein the delivery preference indicates how the registered user desires to receive the personalized periodic news digest document;

receiving the personal information of the registered user and a news article preference of the registered user;

searching at least one location for content items that match at least one of: the personal information and the news article preference, the content items comprising a plurality of news articles, wherein the content items comprise sports, local and foreign affairs, and legal;

receiving the content items that match;

automatically generating, from the matching news articles that are received, a print-ready personalized periodic news digest document that comprises the matching news articles, the personalized periodic news digest document being generated as a document selected from a group consisting of: an email, a web page, an electronic file, and a fax, in accordance with the delivery preference of the registered user;

electronically pushing the personalized periodic news digest document directly to the registered user in accordance with the delivery preference of said registered user; and initiating a client module of the registered user such that the client module automatically prints the personalized periodic news digest document that was electronically pushed to the registered user.

12. The tangible computer-readable storage medium according to claim 11, wherein the delivery preference also indicates a document template selected by the registered user, said document template specifying a presentation format for the personalized periodic news digest document; and in the automatically generating step, the personalized periodic news digest document is formatted in accordance with the document template selected by the registered user.

13. The tangible computer-readable storage medium according to claim 11, wherein the delivery preference also indicates a maximum total number of printed pages for the personalized periodic news digest document.

14. The tangible computer-readable storage medium according to claim 11, wherein said computer program further contains instructions for performing steps of:

supplying advertising content based on at least one of: the personal information and the news article preference; and indicating a location within the personalized periodic news digest document for the advertising content that is supplied.

15. The computer system according to claim 1, wherein the delivery preference also indicates at least one of: when the registered user desires to receive the personalized periodic news digest document, and a frequency at which the registered user desires to receive the personalized periodic news digest document.

16. The computer system according to claim 1, wherein the delivery preference also indicates an at least one format preference for the personalized periodic news digest document.

17. The computer system according to claim 1, wherein the content preference indicates that the registered user desires to receive at least one of foreign affairs news articles, local government news articles, sports news articles, and weather news articles.

18. The computer system according to claim 1, wherein the at least one processor is further arranged to:

analyze at least one of: the personal information and the news article preference to determine an advertisement to be included within the personalized periodic news digest document; and select a location within the personalized periodic news digest document for the advertisement based on where one of the content items will appear in the personalized periodic news digest document, wherein the print-ready personalized periodic news digest document that is generated also includes the advertisement at the location that is selected.

19. The method according to claim 6, further comprising steps of:

analyzing at least one of: the personal information and the news article preference to determine an advertisement to be included within the personalized periodic news digest document; and selecting a location within the personalized periodic news digest document for the advertisement based on where one of the news articles will appear in the personalized periodic news digest document, wherein in the automatically generating step, the print-ready personalized periodic news digest document that is generated also includes the advertisement at the location that is selected.

* * * * *